UNITED STATES PATENT OFFICE.

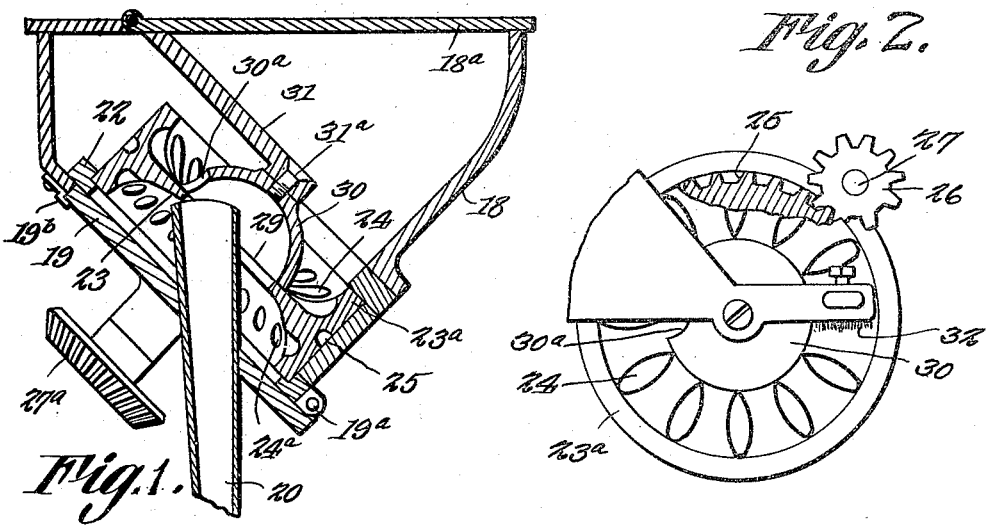

JOSEPH M. HARTMAN, OF YARDLEY, PENNSYLVANIA.

SEED-PLANTER.

1,293,092.

Specification of Letters Patent.

Patented Feb. 4, 1919.

Application filed April 25, 1918. Serial No. 230,690.

*To all whom it may concern:*

Be it known that I, JOSEPH M. HARTMAN, a citizen of the United States, residing at Yardley, in the county of Bucks and State of Pennsylvania, have invented certain new and useful Improvements in Seed-Planters, of which the following is a specification.

This invention relates to implements for planting seeds, and its object is to provide an implement of this kind which is adapted more particularly for gardening, and one which is easy to operate, simple in structure, and adapted for planting different kinds of seeds.

With the object stated in view, the invention consists in a novel combination and arrangement of parts to be hereinafter described and claimed, and in order that the same may be better understood, reference is had to the accompanying drawings, it being understood that while the preferred embodiment of the invention has been shown, various changes and modifications may be resorted to without a departure from the spirit and scope of the invention as claimed hereinafter.

In the drawings,

Figure 1 is a vertical section of the seed dropping mechanism, partly broken away, and Fig. 2 is a plan view of said mechanism.

At 18 is shown a seed hopper or box having a hinged lid 18$^a$ at the top for the entry of the supply of seed. The hopper has a sloping or inclined bottom 19 which is hinged, as shown at 19$^a$ so that it may be swung open for access to the seed dropping mechanism in the hopper. A suitable latch 19$^b$ is provided for holding the hopper bottom closed.

Through the hopper bottom 19 passes a seed tube 20 which extends to a furrow opener. The upper end of the tube extends vertically into the hopper from the inclined bottom thereof as clearly shown in Fig. 1.

On a shouldered guide or bearing ring 22 in the hopper, over the bottom thereof, rotatably seats a seed dropping wheel composed of a web 23 and a rim 23$^a$ projecting from both sides thereof. The rim, on one side of the web, has seed pockets 24 in its inner face and on the other side of the web are smaller seed pockets 24$^a$. The wheel is reversible so that either set of seed pockets may be brought into play. Fig. 1 shows the wheel positioned to bring the pockets 24 in operative position. The implement is therefore adapted for different kinds and sizes of seeds.

The seed dropping wheel is positioned to rotate about an axis perpendicular to the hopper bottom, and as the latter is inclined, the wheel is positioned in the hopper obliquely or at an inclination to the horizontal. On the periphery of the wheel are spur gear teeth 25 meshing with a drive pinion 26 on a shaft 27 connected by a bevel gear 27$^a$ to a suitable driving means.

The web 23 of the seed wheel has a central opening 29 into which the upper end of the seed tube 20 extends, this end of the tube being open as shown in Fig. 1. Above the opening 29, and the upper end of the seed tube is mounted a hood 30 having an opening 30$^a$ in line with the upper end of the tube. The seed pockets 24 (or 24$^a$), one after the other, as the wheel rotates, face the opening 30$^a$, and the seeds drop out of the pockets through said opening into the tube 20, which latter conducts the seeds to the ground and drops the same behind the furrow opener 21. By reason of the inclination of the seed wheel, the seeds collect on the lowermost portion thereof, and they are elevated by the pockets to the opening 30$^a$ as the wheel rotates. The hood 30 seats inside the pocketed rim of the seed wheel, and any seeds failing to drop into the opening 30 slide around the hood back to the lower portion of the wheel.

The hood 30 is carried by a bracket member 31 supported by the top of the hopper 18. A screw 31$^a$ passes from the bracket member into the apex of the hood and secures the latter. As the hood seats on the web 23 of the seed wheel, it also serves to hold the latter seated on the bearing or guide ring 22. The member 31 also carries the usual brush 32 to sweep the excess of seeds off the seed wheel.

I claim:

1. In a seed planter, a seed box, a seed delivery tube extending thereinto from the bottom, a seed delivery wheel in the seed box and positioned obliquely to the seed tube, said wheel having an opening into which the tube extends, a hood seating over the opening and having an opening which is in alinement with the seed tube, and means on the seed wheel for carrying the seed to the hood opening.

2. In a seed planter, a seed box, a seed delivery tube extending thereinto from the bottom, a seed delivery wheel in the seed box and positioned obliquely to the seed tube, said wheel being composed of a web and an outstanding rim, the web having a central opening, and the rim having seed pockets in its inner face, into which opening the seed tube extends, and a hood seating over the opening and having an opening which faces the seed pockets and is in alinement with the seed tube.

3. In a seed planter, a seed delivery wheel comprising a web and a rim projecting from both sides thereof, said rim having a series of seed pockets on each side of the web, and the wheel being reversible to bring either series of pockets into operative position.

In testimony whereof I affix my signature in presence of two witnesses.

JOSEPH M. HARTMAN.

Witnesses:
W. L. GELBACH,
MAURICE H. DORSEY.

Copies of this patent may be obtained for five cents each, by addressing the "Commissioner of Patents, Washington, D. C."